US008256664B1

(12) United States Patent
Balfanz et al.

(10) Patent No.: US 8,256,664 B1
(45) Date of Patent: Sep. 4, 2012

(54) OUT-OF BAND AUTHENTICATION OF BROWSER SESSIONS

(75) Inventors: Dirk Balfanz, Redwood City, CA (US); Breno Fonseca de Medeiros, Fremont, CA (US); Sheldon Walfish, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 12/757,409

(22) Filed: Apr. 9, 2010

(51) Int. Cl.
*G06F 17/00* (2006.01)

(52) U.S. Cl. ....................................................... 235/375

(58) Field of Classification Search .................. 713/182, 713/183; 235/375
See application file for complete search history.

(56) References Cited

U.S. PATENT DOCUMENTS

| 8,024,576 B2 * | 9/2011 | Gargaro et al. ............... 713/183 |
| 2011/0219427 A1 * | 9/2011 | Hito et al. .......................... 726/3 |

OTHER PUBLICATIONS http://forum.stanford.edu/events/bendodsoninfo.php, 1 page, printed on May 3, 2010.
Ben Dodson, Debangsu Sengupta, Dan Boneh, Monica S. Lam, Snap2Pass: Consumer-Friendly Challenge-Response Authentication With a Phone (posted on Mar. 30, 2010, at http://prpl.stanford.edu/papers/soups10j.pdf).

* cited by examiner

*Primary Examiner* — Jamara Franklin
(74) *Attorney, Agent, or Firm* — Lerner, David, Littenberg, Krumholz & Mentlik, LLP (57) ABSTRACT

Systems and methods provide a user with secure access to a web site at a first client device without having to enter login information, such as a username and password, at that device. For example, the first device may request access to user information from a server system. The server may generate a session ID, associate it with the first device, and encode it into a bar code that is displayed at the first device. Using camera functions, a second client device may identify and decode the bar code to determine the session ID. The login information may be entered into the second device in order to establish a secure connection with the server. The second device may transmit the session ID to the server system. The server may identify the first client device based on the common session ID and transmit the requested user information to the first device.

21 Claims, 8 Drawing Sheets

OUT-OF BAND AUTHENTICATION OF BROWSER SESSIONS

BACKGROUND OF THE INVENTION

Online account systems generally require users to enter password information in order to access information stored at the account. It is common for users of these systems to have many such accounts, for example, for shopping, emailing, or banking. Accordingly, these users may tend to use the same password for multiple online accounts or use easy to remember passwords, which may be considered "weak." Unfortunately, user's passwords are vulnerable to theft by third parties which misuse accounts in order to send out spam emails or steal personal information such as credit cards or other valuable information.

Some users may select or be provided with passwords which are somewhat more complicated and possibly difficult to remember. These "strong" passwords may require users to store passwords in a location convenient to their personal computer or to rely on their personal computer's password manager to pre-store passwords. However, these methods may become problematic where the user is using another computer which does not have a list of the user's passwords pre-stored.

Third parties attempting to steal passwords may gather account access information by using, for example malware. Some malware programs may use a key logger or packet sniffer to record usernames and passwords. The malware program may send this information to third parties, which may use the information to log into accounts and steal information. In another example, a user may unknowingly send a phishing site disguised as a legitimate web site, the user's username and password. Thus, protecting user passwords and establishing secure connections between network computers can assist in preventing the loss of information.

Some consumer electronic systems provide users passwords or PIN numbers in order to connect a first device to an online system by granting access to a second device. These systems require users to "enroll" in a program, for example to download videos, allowing the user to access the program from multiple locations. In one example, a user's television may display a PIN number. The user may log into an account at a web site and enter the PIN number at the web site. This will allow the television to access the user's online account. These systems involve quite a bit of manual work by the user, which may include reading and typing sometimes complicated PIN numbers.

Other systems allow users to make secure connections between two devices by "pairing." For example, by taking pictures of quick response bar codes incorporating identification information, two devices may use this information to establish a secure connection between the devices.

BRIEF SUMMARY OF THE INVENTION

The present invention relates generally to providing an authentication system for secure access to web sites. More specifically, the invention relates to providing an authentication which does not require the user to directly enter a password into a login screen. This may be beneficial where the user is attempting to log into an account at a computing system which the user is unfamiliar with or is skeptical of the privacy or confidentiality of information entered into the computing system.

In one aspect of the invention, a method of providing information is provided. The method includes receiving, at a computer of the network, a request for information, the request originating from a first client device of the network; generating a first identifier associated with the request; associating the first identifier with the first client device; storing the association in memory accessible by the computer; generating encoded information based on the first identifier; transmitting, to the first client device, the encoded information; receiving, from a second client device of the network, a second identifier, where the second client device has determined the second identifier from the encoded information; and transmitting the requested information based on whether the second identifier is the same as the first identifier.

In one example, the method also includes receiving consent information from the second client device. In another example, the second client device is a mobile phone. In another example, the computer is a web server. In another example, wherein the information is associated with a user and the method further comprising establishing an authenticated connection with the second client device that securely identifies. In another example, establishment of the authenticated connection includes receiving, from the second device, login information for the user. In another example, the encoded information includes a bar code. In another example, the bar code is a quick response bar code. In another example, the bar code includes an encoded URL. In another example, the second device includes a camera function and has identified the second identifier based on an image of the bar code. In another example, the encoded information includes an audio signal. In another example, the second device includes a microphone for recording audio and has identified the second identifier from a recording of the audio signal. In another example, the requested information includes email account information. In another example, the first identifier and second identifier are session identifiers. In another example, the requested information is associated with the login information and the method also includes transmitting to the first client device a request for login information associated with the requested information.

In another example, the requested information includes personal calendar information. In another example, the login information is received from the second client device before the second identifier is received. In another example, the login information includes a username and password.

Another aspect of the invention provides a device for providing information via a network. The device includes electronic memory accessible by the device and a processor. The processor is programmed to receive a request for information from a first client device of the network; generate a first identifier associated with the request; associate the first identifier with the first client device; store the association in the electronic memory; generate encoded information based on the identifier; transmit via the network, to the first client device, the encoded information; receive, from a second client device, a second identifier, where the second device has identified the second identifier from the encoded information; and transmit the requested information to the first client device based on whether the second identifier is the same as the first identifier.

In one example, the processor is further programmer to receive consent information from the second client device. In another example, the second client device is a mobile phone. In another example, the computer is a web server. In another example, wherein the information is associated with a user and the processor is further programmed to establish an authenticated connection with the second client device that securely identifies. In another example, establishment of the authenticated connection includes receiving, from the second device, login information for the user. In another example, the encoded information includes a bar code. In another example, the bar code is a quick response bar code. In another example, the bar code includes an encoded URL. In another example, the second device includes a camera function and has identified the second identifier based on an image of the bar code. In another example, the encoded information includes an audio signal. In another example, the second device includes a microphone for recording audio and has identified the second identifier from a recording of the audio signal. In another example, the requested information includes email account information. In another example, the first identifier and second identifier are session identifiers. In another example, the requested information is associated with login information and the processor is further programmed to transmit to the first client device a request for login information associated with the requested information. In another example, the requested information includes personal calendar information. In another example, the processor is further programmed to receive the login information from the second client device before receiving the second identifier. In another example, the login information includes a username and password.

Another aspect of the invention provides a system including a computer including memory and a processor; a first client device including a display apparatus and a processor; and a second client device including a camera and a processor. The processor of the first computer is programmed to receive a request for information; generate a first identifier associated with the request; associate the first identifier with the first client device; store the association in the electronic memory; generate a bar code based on the first identifier; transmit, to the first client device, the bar code; receive, from a second client device, a second identifier; and transmit the requested information to the first client device based on whether the second identifier is the same as the first identifier. The processor of the first client device is programmed to transmit the request for information; receive the bar code from the computer; and display, on the display apparatus, the bar code. The processor of the second client device is programmed to identify the bar code from an image of the display apparatus collected by the camera; generate a second identifier from the bar code; and transmit the second identifier to the computer.

In one example, the processor of the computer is further programmer to receive consent information from the second client device. In another example, the second client device is a mobile phone. In another example, wherein the information is associated with a user and the processor of the computer is further programmed to establish an authenticated connection with the second client device that securely identifies. In another example, establishment of the authenticated connection includes receiving, from the second device, login information for the user. In another example, the second device further comprises a bar code reader and the processor of the second device is further programmed to utilize the bar code reader to identify the encoded information. In another example, the bar code includes text identifying the computer. In another example, the processor of the second device is programmed to display a request consent information. In another example, the computer is a web server. In another example, the bar code is a quick response bar code. In another example, the bar code includes an encoded URL. In another example, the requested information includes email account information. In another example, the first identifier and second identifier are session identifiers. In another example, the requested information is associated with login information and the processor of the computer is further programmed to transmit to the first client device a request for login information associated with the network location. In another example, the requested information includes personal calendar information. In another example, the processor of the second client device is programmed to display a second request for login information associated with the network location. In another example, the processor is further programmed to receive the login information from the second client device before receiving the second identifier. In another example, the login information includes a username and password.

Another aspect of the invention provide a system including a computer including memory and a processor; a first client device including a speaker apparatus and a processor; and a second client device including a microphone and a processor. The processor of the first computer is programmed to receive a request for information; generate a first identifier associated with the request; associate the first identifier with the first client device; store the association in the electronic memory; generate an audio signal based on the first identifier; transmit, to the first client device, the audio signal; receive, from a second client device, and a second identifier; and transmit the requested information to the first client device based on whether the second identifier is the same as the first identifier. The processor of the first client device is programmed to transmit the request for access to the network location; receive the audio signal from the computer; and play, using the speaker apparatus, the audio signal. The processor of the second client device is programmed to generate an audio recording of the audio signal using the microphone apparatus; generate a second identifier from the audio recording; and transmit the second identifier to the computer.

In one example, the processor of the computer is further programmer to receive consent information from the second client device. In another example, the second client device is a mobile phone. In another example, wherein the information is associated with a user and the processor of the second device is programmed to establish an authenticated connection with the second client device that securely identifies. In another example, establishment of the authenticated connection includes receiving, from the second device, login information for the user. In another example, the audio signal includes text identifying the computer. In another example, the information is associated with login information and the processor of the computer is further programmed to receive, from the second client device, the login information; and establish an authenticated connection with the second client device based on the received login information. In another example, the computer is a web server. In another example, requested information includes email account information. In another example, the first identifier and second identifier are session identifiers. In another example, the requested information is associated with login information and the processor of the computer is further programmed to transmit to the first client device a request for login information associated with the requested information. In another example, the requested information includes personal calendar information. In another example, the processor of the second client device is programmed to display a second request for login information associated with the network location on a display apparatus. In another example, the processor is further programmed to receive the requested login information from the second client device before receiving the second identifier. In another example, the login information includes a username and password.

DETAILED DESCRIPTION

In one embodiment, a first device may request information associated with an unspecified user. The server may generate a session ID and encode it into a bar code that is displayed at the first device. Using camera functions, a second client device may identify and decode the bar code to determine the session ID. Login information for a particular user may be entered into the second device in order to establish an authenticated connection with the server. The second device may transmit the session ID to the server system. The server may identify the first client device based on the common session ID and transmit the information associated with the particular user to the first client device. In other embodiments, other encoding methods, such as audio recordings, may be used.

Aspects, features and advantages of the present invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1A:
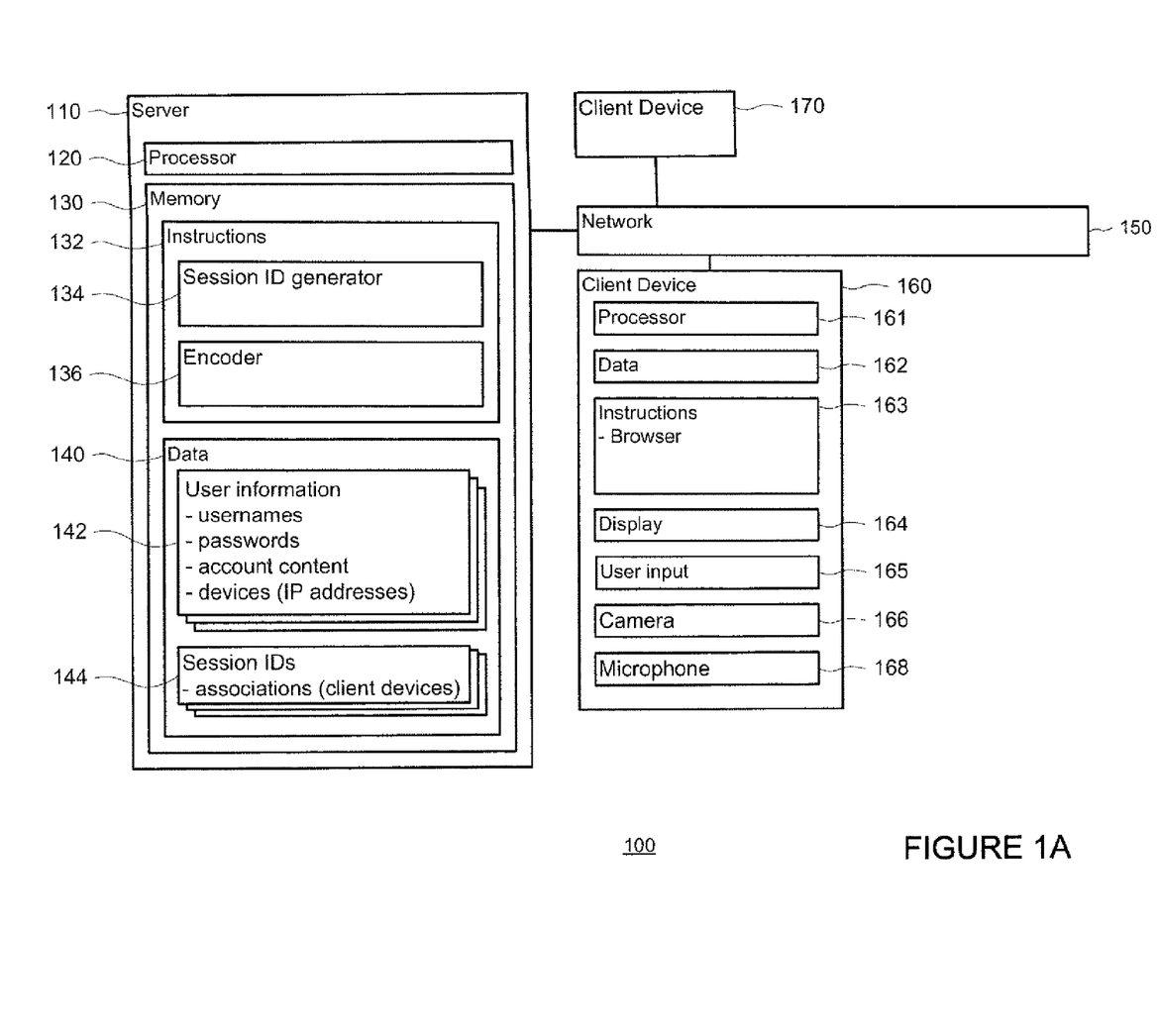
FIG. 1A is a functional diagram of a system in accordance with an aspect of the invention.
Figure 1B:
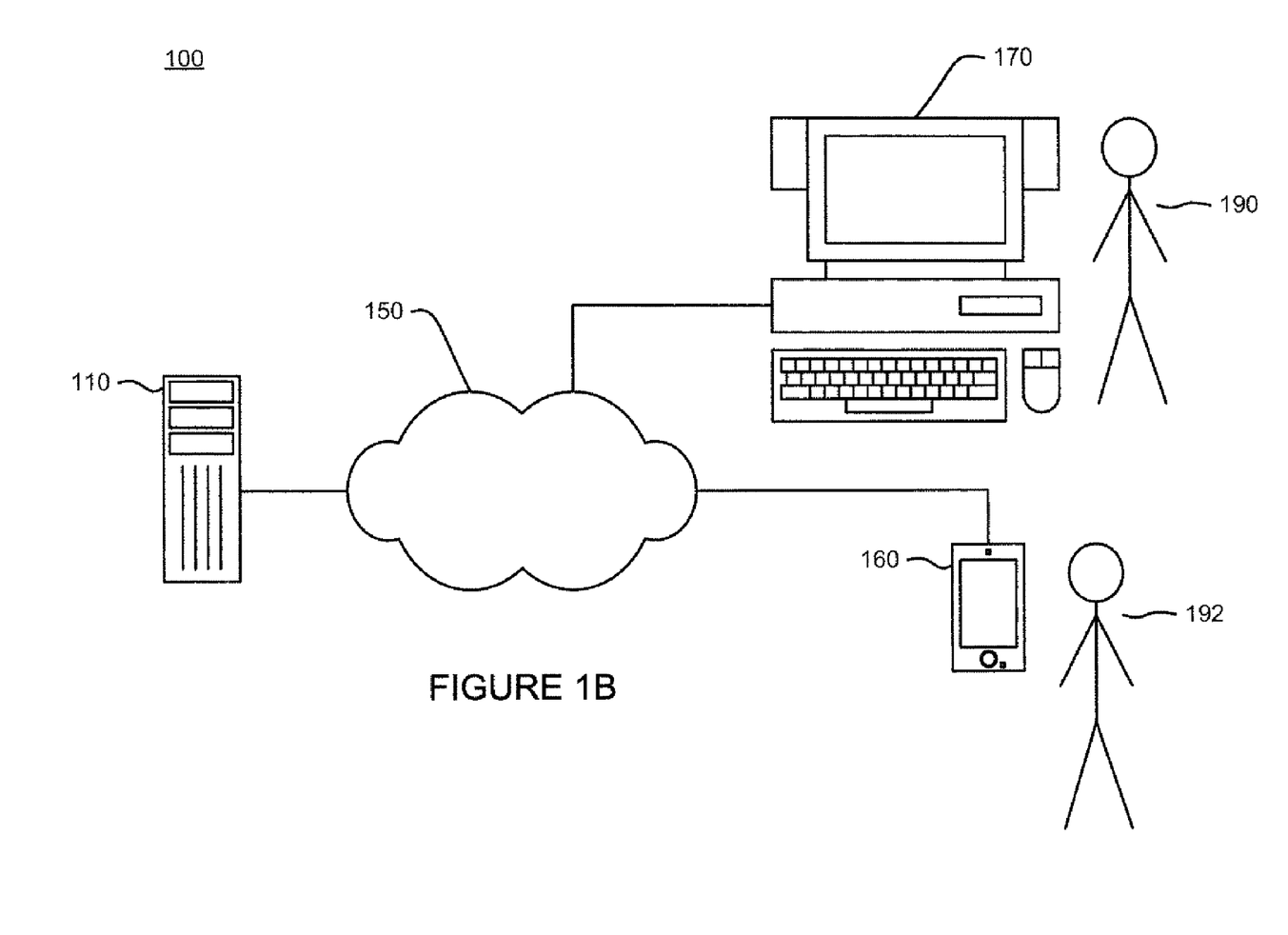
FIG. 1B is a pictorial diagram of a system in accordance with an aspect of the invention.

As shown in FIGS. 1A-B, a system 100 in accordance with one aspect of the invention includes a computer 110 containing a processor 120, memory 130 and other components typically present in general purpose computers.

The memory 130 stores information accessible by processor 120, including instructions 132 and data 140 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 140 may be retrieved, stored or modified by processor 120 in accordance with instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1A functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user 190 on display 164 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Each node may be associated with a network address which may be used to identify the device on the network. For example, each device may be assigned an IP address. An IP address may be expressed as binary numbers or various combinations of numbers, letters, or both.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP, HTTPS, SMTP, and various combinations of the foregoing. Although only a few computers are depicted in FIGS. 1A-B, it should be appreciated that a typical system can include a large number of connected computers.

Each client device may be configured similarly to the server 110, with a processor, memory and instructions. Each client device 160 or 170 may be a personal computer intended for use by a person 190 or 192, and have all of the components normally used in connection with a personal computer such as a central processing unit (CPU) 161, memory (e.g., RAM and internal hard drives) storing data 162 and instructions 163 including a web browser, an electronic display 164 (e.g., a monitor having a screen, a small LCD touch-screen, a projector, a television, a computer printer or any other electrical device that is operable to display information), user input 165 (e.g., a mouse, keyboard, touch-screen), camera 166, microphone 168, speakers, a network interface device, and all of the components used for connecting these elements to one another.

Although the client devices 160 and 170 may each comprise a full-sized personal computer, they may alternatively comprise mobile computing devices capable of wirelessly exchanging data with a server over a network such as the Internet. By way of example only, client device 160 may be a wireless-enabled PDA or a mobile phone capable of obtaining information via the Internet. The user may input information using a small keyboard, a keypad or a touch screen. Indeed, computers in accordance with the systems and methods described herein may comprise any device capable of processing instructions and transmitting data to and from humans and other computers including general purpose computers, and network computers lacking local storage capability Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Returning to FIG. 1A, server 110 may have access to user information 142. The user information may identify users of the systems, i.e., any entity that interacts with the system and method such as businesses or people. User information may include information such as user names, passwords, account content, and network addresses identifying user devices. As will be described in more detail below, server 110 may access this information when a client device requests access to information at the server.

Data 140 may also include session identifiers ("session IDs") 144. Server 110 may generate session IDs using session ID generator 134. When server 110 receives a request for information, such as for access to data associated with a particular user, the server may use session ID generator 134 to establish a session ID for the login. As will be described in more detail below, session IDs may be sent and received by the server and/or client devices and the server may associate one or more client devices with a particular session ID.

The session ID may be associated with additional information. For example, a particular session ID may be associated with a request for a particular product, such as a user's personal email account or personal calendar. As will be described in more detail below, the server may use this information to select which product to provide to a particular user.

Server 110 may also use session IDs and encoder 136 to generate encoded information. In one example, encoder 136 may generate bar codes. These bar codes may be quick response ("QR") barcodes which may be used to encode web site locations such as URLs and other information. QR bar codes may be displayed as two dimensional, visual representations of information. As will be described below, encoder 136 may encode the session ID of a particular session into the encoded information.

Although the examples below are described in the context of bar codes, specifically QR bar codes, it will be understood that other method of encoding information, may be used. For example, other types of bar codes or other ways of visually encoding the information such as through a succession of changing images may be used. In another example, the information may be encoded as an audio signal. Any of the preceding examples may be used alone or in combination. These examples allow the user to identify the source, or device, from which the information is being played or displayed.

In addition to the operations described below and illustrated in the figures, various operations in accordance with a variety of aspects of the invention will now be described. It should be understood that the following operations do not have to be performed in the precise order described below. Rather, various steps can be handled in reverse order or simultaneously.

A first client device may transmit a request for user information to a server on a network. The request may identify the requesting client device. Upon receipt of the request, the server may generate a session ID. The server may also associate the session ID with the first client device and store this association for future use. The server may use the session ID and, optionally, a network location associated with the server to generate encoded information. The server may transmit the encoded information to the first client device.

For example, client device 170 may transmit a request for user information such as a personal email account of "www.a.com" to server 110. Client device 170 may establish an HTTP, or HTTPS, connection to server 110. Upon connecting to the server, for example during the HTTP protocols, the client and server may exchange additional information such as client device's IP address or other identifying information.

In response to the request, server 110 may generate a session ID to identify the HTTP connection between server 110 and client device 170. Server 110 may associate client device 170 with the generated session ID, and store this association in memory accessibly by server 110. Server 110 may also generate a bar code, for example a QR bar code, incorporating the session ID information as well as a network location associated with the server 110. Server 110 may transmit the QR bar code to client device 170. In addition, the server may also transmit a request for login information or a login page of the requested web site for display on client device 170.

Figure 2:
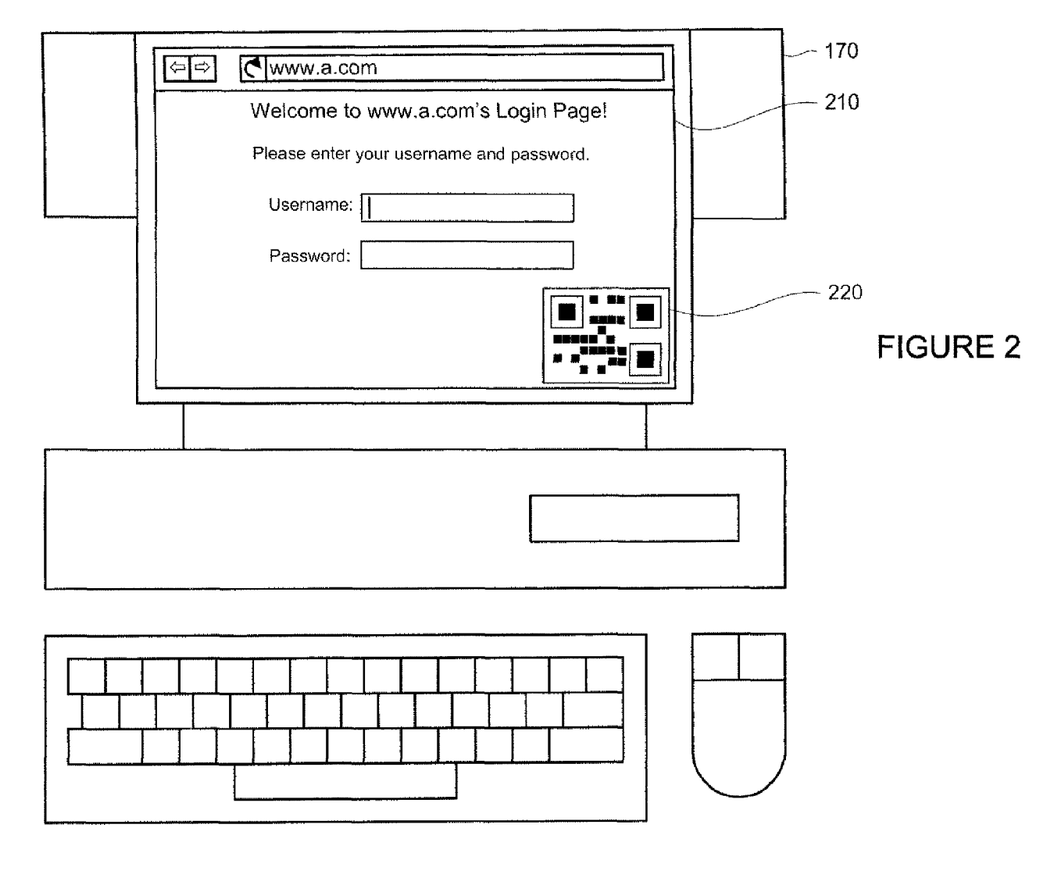
FIG. 2 is a diagram of a client device in accordance with an aspect of the invention.

Upon receiving the OR bar code, client device 170 may display a web page as shown in FIG. 2. Although client device 170 is depicted as a desktop PC, it will be understood that the first client device may be any type of computing device capable of sending and receiving information over a network as noted above. In one example, the web page may be a login page. Login page 210 may include, for example, an area in which the user of client device 170 may enter the login information, such as user name and password. In addition, login page 210 may include QR bar code 220. As noted above, QR bar code 220 may be the bar code generated by the server which incorporates the session ID. It will be understood that the image of QR bar code 220 is merely one example of various configurations that may be implemented.

Alternatively, the server may transmit the session ID to the first client device. Once the first client device has received the session ID from the server, the first client device will transmit the session ID back to the server. Upon receipt of the session ID, the server may associate the first client device with the session ID and may store this association.

For example, client device 170 may receive the session ID from the server and automatically retransmit it to the server. The client device 170 may identify the instruction to retransmit the session ID by executing JavaScript embedded in the login page received from the server. In response, server 110 may associate the IP address of client device 170 with the session ID and may store this association for later use.

Once the first client device has received the encoded information, a second client device may be used to read and decode the information contained in the encoded information, such as the session ID and the network location of the server. For example, if the encoded information is a bar code, and the second client device is an Internet-enabled cell phone with a camera, the user may position the cell phone such that the bar code displayed on the first client device is within a region that may be captured as an image by the camera. In one aspect, the phone may decode the bar code, i.e. extract the session ID and network location associated with the user information from the bar code. In another example, the server may encode the session ID into an audio signal that may be played by the first client device. The second client device may record the audio signal and decode the session ID and the network location associated with the user information. Once the second client device has decoded the encoded information, the second client device may transmit the session ID to the server for authentication of the first client device. Alternatively, the second client device may identify the network location associated with the user information based on information stored locally at the second client device.

Optionally, once the second device has identified the session ID, the second device may display a user consent page requesting the user to consent to sending information to the server.

Figure 3:
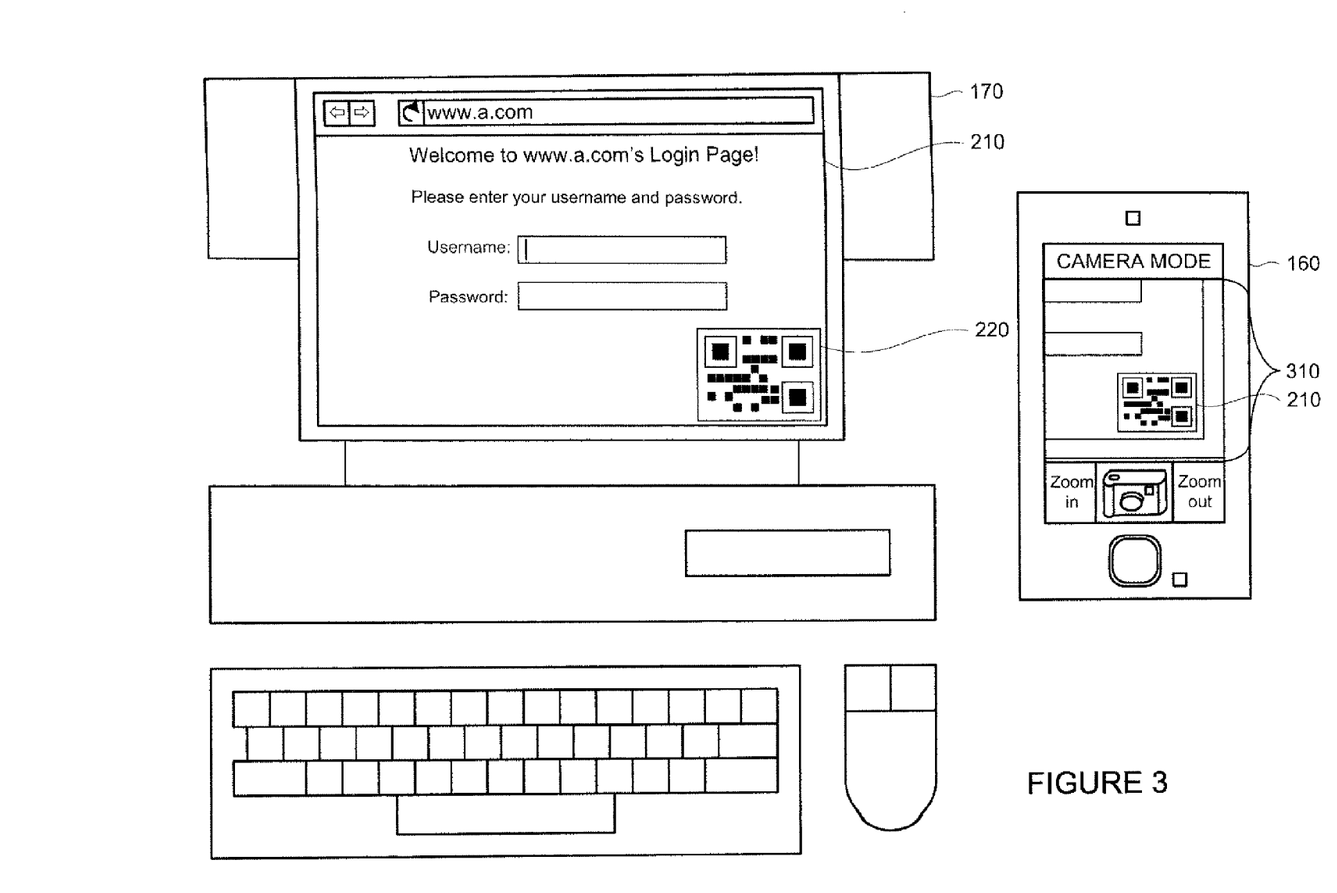
FIG. 3 is a diagram of two client devices in accordance with an aspect of the invention.

As shown in FIG. 3, a second client device such as client device 160 may be positioned such that the QR bar code 220 of login page 210 may be displayed on camera image display 310. Although client device 160 is depicted as a mobile phone, it will be understood that the first client device may be any type of computing device capable of sending and receiving information over a network as noted above. In one example, using camera 166, client device 160 may capture the image of camera image display 310, store the image, and access the stored image. From the stored image, client device 160 may identify and decode the QR bar code 220 in order to identify the session ID generated by server 110. In another example, client device 160 may read QR bar code 220 directly from the camera image display and identify the session ID without first capturing and storing the image.

In addition to or in place of a camera, the client device may use any number of apparatuses to read bar codes. For example, client device 160 may also include a traditional bar code reader, such as a reader used to read barcodes on food or clothing labels. Client device 160 may employ the bar code reader to read the bar code and identify encoded information.

Alternatively, server 110 may encode the session ID into an audio signal which is transmitted to client device 160. Once the audio signal is received by client device 170, the audio signal may be played automatically, or the login page may display an option to play the audio signal. Client device 160 may use microphone 168 to receive or record the audio signal. Client device 160 may then decode the session ID from the audio signal.

Figure 4:
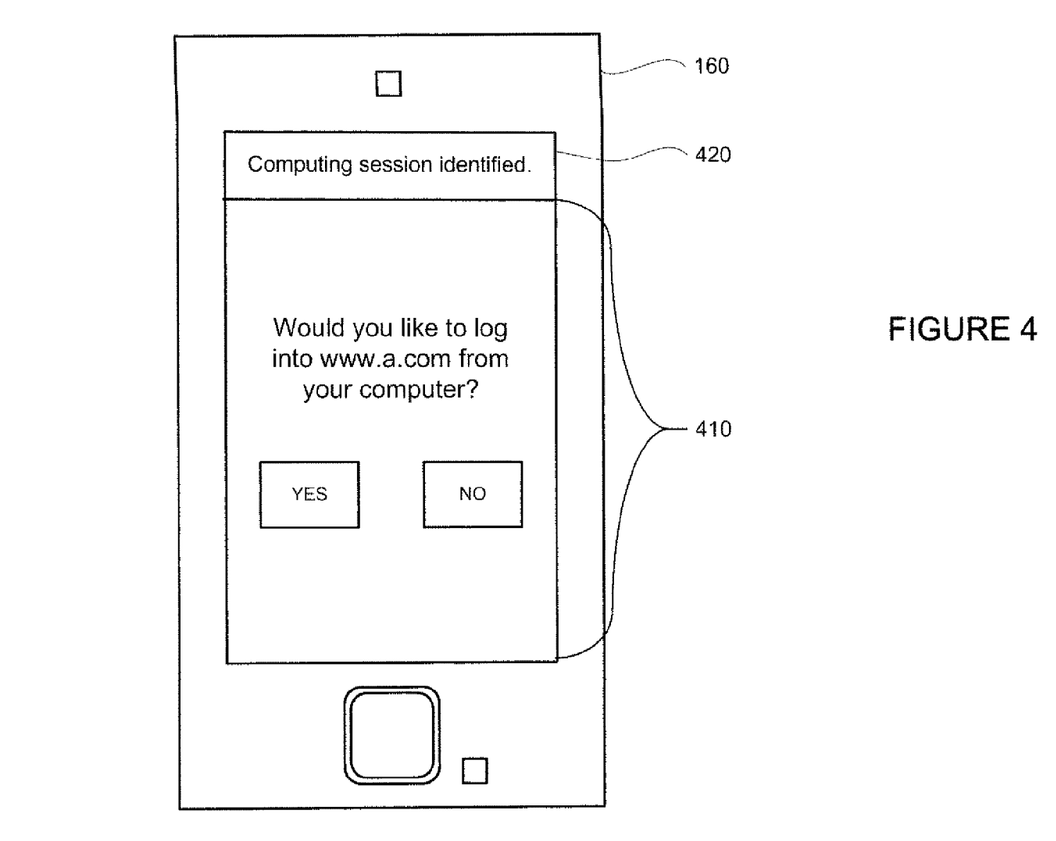
FIG. 4 is a client device in accordance with an aspect of the invention.

After identifying the session ID, client device 160 may request confirmation from the user that the user would like to log into server 110 and access www.a.com. As shown in FIG. 4, in addition to requesting consent 410, client device 160 may also display an indication 420 that the client device 160 has identified the session ID.

If the second client device receives consent from the user, the client device may also request the login information associated with the requested user's information to be transmitted to the server. The login information is used to set up an authenticated connection between the server and the second client device. In some examples, the second client device may have provided the login information to the server much earlier, and thus the authenticated connection may be established prior to identifying the session ID. Therefore, the second client device may not request the user's login information after identifying the session ID.

Figure 5:
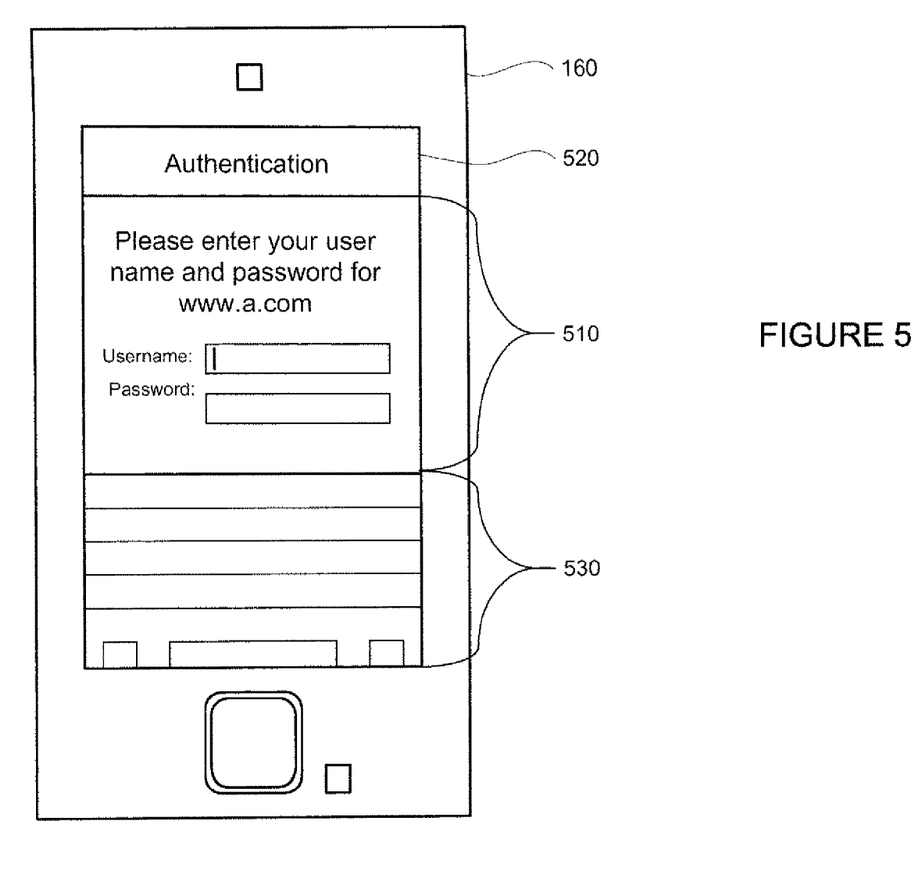
FIG. 5 is a client device in accordance with an aspect of the invention.

For example, as shown in FIG. 5, client device 160 may display a request 510 for the user's username and password for the requested email account at an authentication screen 520 before or after identifying the encoded session ID. If not previously stored at client device 160 the user may enter this information using, for example a keyboard 530 or other user input. Client device 160 may transmit the username and password to server 110 in order to establish an authenticated connection.

Once the second client device has been authenticated, the second device transmits the consent and session ID to the server. The server receives the session ID, and determines whether the received session ID corresponds to a stored session ID. Based on the received login information used to create the authenticated connection, the server may identify the requested user information and transmit it to the first client device. This allows the user to enter login information only into the second client device, rather than the first client device.

After the authenticated connection with server 110 has been established, client device 160 may transmit to the server the identified session ID. For example, server 110 may receive session ID and compare it to the session IDs that server 110 has associated with client devices. Thus, server 110 may identify the session ID previously associated with client device 170. In another example, when server 110 receives the consent and session ID from client device 160, the server may associate the session ID with client device 160. Server 110 may then identify which HTTP connection is associated with the session ID. In the example, the server may identify the HTTP connection to client device 170.

Figure 6:
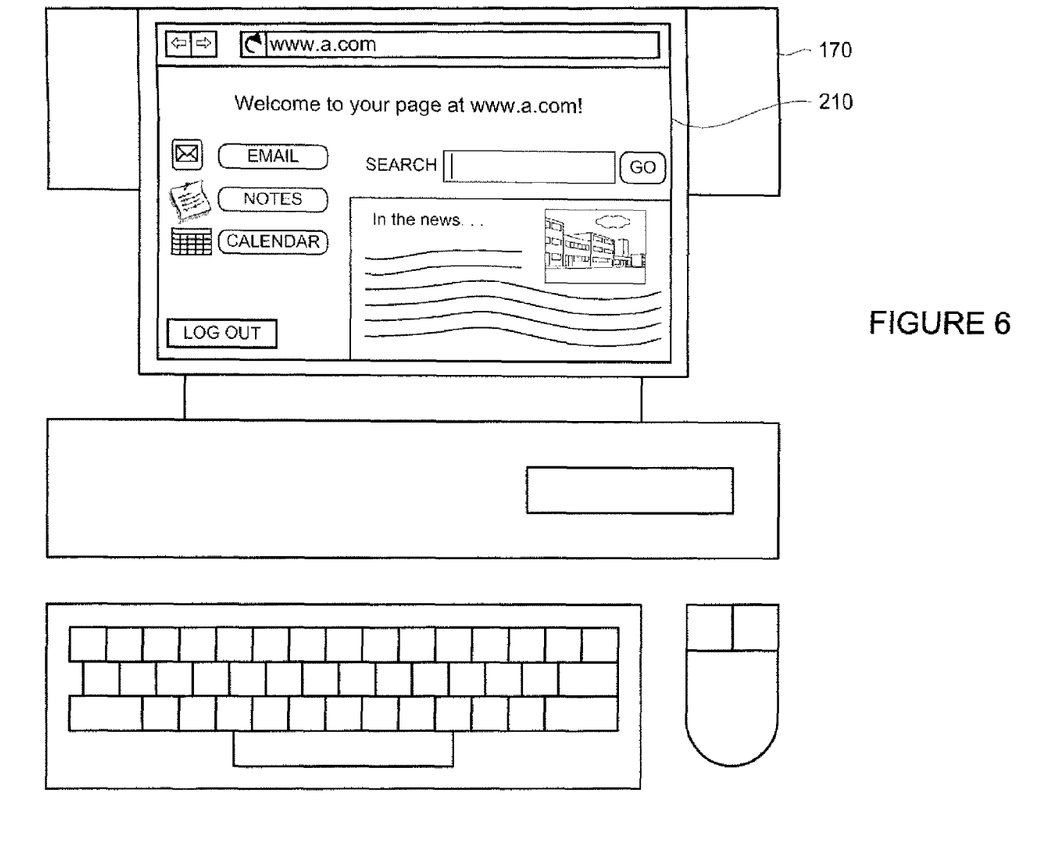
FIG. 6 is a client device in accordance with an aspect of the invention.

Server 110 may also identify the requested email account based on the login information used to establish the authenticated connection and transmit the requested email account to client device 170. For example, server 110 may transmit the email account web site, www.a.com, to client device 170. Server 110 may also transmit any private user data, for example, the user's email inbox data, through the HTTP connection to client device 170. As shown in FIG. 6, client device 170 may display web site information 610 received from server 110.

Figure 7:
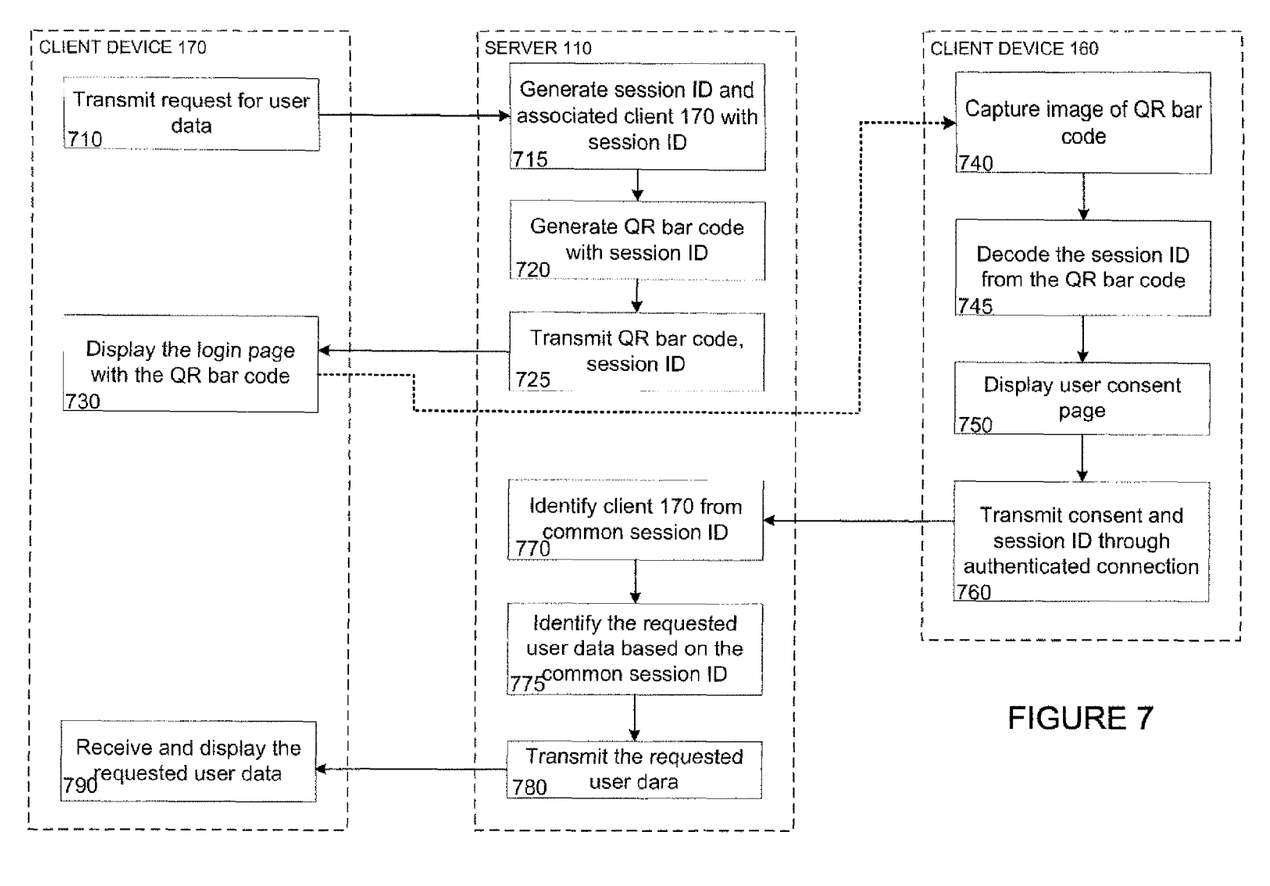
FIG. 7 is a flow diagram in accordance with an aspect of the invention.

FIG. 7 is an exemplary flow diagram of the exchanges of information described above. As shown in block 710, a client device, such as client device 170, transmits a request for user data to a server, such as server 110. At block 715, server 110 receives the request and generate a session ID and associates this session ID with client device 170. Next, the server generates a QR bar code incorporating the session ID, as shown in block 725. Then, at block 725, server 110 transmits the QR bar code to client device 170. Client device 170 displays the QR bar code as shown in block 730.

Once client computer 170 has displayed the QR bar code, client computer 160 captures the image of the QR bar code, as shown in block 740. At block 745, client device 160 decodes the session ID from the QR bar code, and, at block 750, displays a confirmation page requesting the user's consent to send the session ID to server 110. Client device 160 may also request the user's login information for the web site requested by client device 170 in order to establish an authenticated connection. Once client device 160 has identified the session ID and established an authenticated connection, client device 160 transmits the session ID to server 110 at block 760.

Upon receipt of the session ID from client device, server 110 determines that the received session ID is associated with client device 170 as shown in block 770. In addition, sever 110 identifies the user data associated with the received login information as shown in block 775. Server 110 transmits the requested user data to client device 170 at block 780. Client device 170 receives the information and display the web site and user data as shown in block 790.

As explained above, the second client device may request login information from the user to transmit to the server in order to establish the authenticated connection. In one embodiment, the second client device's web browser may navigate to the server's login page and the user may enter the login information to authenticate the second client device to the server. The server may then set a "cookie" on the second client device's browser, which may be transmitted to the server with the consent and session ID.

In another embodiment, the server, for example server 110, is actually comprised of a plurality of servers in one or more data centers. For example, a first server may receive the requests for information and associate the first client device with a session ID, while a second server receives the session ID from the second client device. Thus, the second server may send a message including the session ID to the first server which may identify common session IDs and may provide the requested information to the first client device.

In another embodiment, once the server determines that the session ID received from the second device is also associated with the first device, rather than granting access to or sending the requested information, the sever may send credential information to the first client device. These credentials may be used to authenticate the first client device when transmitted back to the server by the first client device, or more specifically, by the first client device's web browser. This cookie may be used in subsequent requests by the first client device for information from the server, for example requests to obtain user data such as the user's email inbox data.

In another embodiment, the encoded information may be presented in such as way as it includes information readily apparent to the user. In one example, if the encoded information is a bar code, the pattern in the bar code may be used to convey additional information to the user, such as if the bar code is arranged to spell out letters and words. These words may identify, for example, the name of the service or server which the user is attempting to access). Thus, in the example of QR bar code 220, this code may be arranged to display www.a.com. In another example, if the encoded information is included in an audio signal, the audio played may include information such as the name or audio associated with the service. Thus, for example, the audio signal may include "You are logging into www.a.com." It will be understood that the encoded information, whether video, audio, one or more images, etc., may include any number of readily understood information.

It will be understood that in addition to accessing accounts at html web pages by personal computer and mobile phones, the system and method may also be used in conjunction with other computer applications, including flash applications; other apparatuses, including set top boxes; and other types of data including xml data.

It will be further understood that the sample values, types and configurations of data described and shown in the figures are for illustration purposes only. In that regard, systems and methods in accordance with aspects of the invention may include different web sites, data values, data types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of providing information via a network, the method comprising:
   receiving, at a computer of the network, a request for information, the request originating from a first client device of the network;
   generating a first identifier associated with the request;
   associating the first identifier with the first client device;
   storing the association in memory accessible by the computer;
   generating encoded information based on the first identifier;
   transmitting, to the first client device, the encoded information;
   receiving, from a second client device of the network, a second identifier, where the second client device has determined the second identifier from the encoded information;
   receiving consent information from the second client device indicating that the first client device has permission to receive the requested information; and
   after receiving the consent information, transmitting the requested information to the first client device based on whether the second identifier is the same as the first identifier.

2. The method of claim 1, wherein the information is associated with a user and the method further comprising establishing an authenticated connection with the second client device that securely identifies.

3. The method of claim 2, wherein establishment of the authenticated connection includes receiving, from the second device, login information for the user.

4. The method of claim 1, wherein the encoded information includes a bar code.

5. The method of claim 4, wherein the bar code is a quick response bar code.

6. The method of claim 4, wherein the bar code includes an encoded URL.

7. The method of claim 4, wherein the second device includes a camera function and has identified the second identifier based on an image of the bar code.

8. The method of claim 1, wherein the encoded information includes an audio signal.

9. The method of claim 8, wherein the second device includes a microphone for recording audio and has identified the second identifier from a recording of the audio signal.

10. The method of claim 1, wherein the requested information includes email account information.

11. The method of claim 1, wherein the first identifier and second identifier are session identifiers.

12. A device for providing information via a network, the device comprising:
  electronic memory accessible by the device;
  a processor programmed to:
  receive a request for access to the information from a first client device of the network;
  generate a first identifier associated with the request;
  associate the first identifier with the first client device;
  store the association in the electronic memory;
  generate encoded information based on the identifier;
  transmit via the network, to the first client device, the encoded information;
  receive, from a second client device, a second identifier, where the second device has identified the second identifier from the encoded information;
  receive consent information from the second client device indicating that the first client device has permission to receive the requested information; and
    after receiving the consent information, transmit the requested information to the first client device based on whether the second identifier is the same as the first identifier.

13. The device of claim 12, wherein the second client device is a mobile phone.

14. The device of claim 12, wherein the first identifier and second identifier are session identifiers.

15. The device of claim 12, wherein the requested information is associated with login information, and the processor is further programmed to transmit to the first client device a request for login information associated with the requested information.

16. The device of claim 15, wherein the processor is further programmed to receive the login information from the second client device before receiving the second identifier.

17. A system comprising;
  a computer including memory and a processor;
  a first client device including a display apparatus and a processor;
  a second client device including a processor;
  the processor of the computer being programmed to:
    receive a request for information from the first client device;
    generate a first identifier associated with the request;
    associate the first identifier with the first client device;
    store the association in the electronic memory;
    generate a bar code based on the first identifier;
    transmit, to the first client device, the bar code;
    receive, from a second client device, the a second identifier;
    receive consent information from the second client device indicating that the first client device has permission to receive the requested information; and
    after receiving the consent information, transmit the requested information to the first client device based on whether the second identifier is the same as the first identifier; and
  the processor of the first client device being programmed to:
    transmit the request for information;
    receive the bar code from the computer; and
    display, on the display apparatus, the bar code; and
  the processor of the second client device being programmed to:
    identify the bar code from an image of the display apparatus;
    display a request for consent information on the display apparatus;
    generate a second identifier from the bar code based on input received from the consent information; and
    transmit the second identifier to the computer.

18. The system of claim 17, wherein the processor of the second client device is programmed to display a second request for login information associated with the network location on a display apparatus.

19. The system of claim 17, wherein the processor is further programmed to receive the login information from the second client device before receiving the second identifier.

20. The system of claim 17, wherein the second device further comprises a bar code reader and the processor of the second device is further programmed to utilize the bar code reader to identify the encoded information.

21. The system of claim 17, wherein the bar code includes text identifying the computer.

* * * * *

UNITED STATES PATENT AND TRADEMARK OFFICE
CERTIFICATE OF CORRECTION

| | | |
|---|---|---|
| PATENT NO. | : 8,256,664 B1 | Page 1 of 1 |
| APPLICATION NO. | : 12/757409 | |
| DATED | : September 4, 2012 | |
| INVENTOR(S) | : Dirk Balfanz, Breno Fonseca de Medeiros and Sheldon Walfish | |

It is certified that error appears in the above-identified patent and that said Letters Patent is hereby corrected as shown below:

In the Specification
Column 11, line 9, "device, the a second" should read --device, a second--

Signed and Sealed this
Eighteenth Day of March, 2014

Michelle K. Lee
*Deputy Director of the United States Patent and Trademark Office*